United States Patent [19]

Osawa et al.

[11] Patent Number: 4,740,696

[45] Date of Patent: Apr. 26, 1988

[54] ICP MASS SPECTROMETER

[75] Inventors: Takao Osawa; Tetsumasa Ito, both of Tokyo, Japan

[73] Assignee: Seiko Instruments & Electronics Ltd., Tokyo, Japan

[21] Appl. No.: 886,977

[22] Filed: Jul. 17, 1986

[30] Foreign Application Priority Data

Jul. 18, 1985 [JP] Japan ................................ 60-159180

[51] Int. Cl.[4] ................................................ B01D 59/44

[52] U.S. Cl. ....................................... 250/288; 250/289

[58] Field of Search ......................... 250/281, 288, 289

[56] References Cited

U.S. PATENT DOCUMENTS

| | | | |
|---|---|---|---|
| 4,144,451 | 3/1979 | Kambara | 250/289 |
| 4,300,044 | 11/1981 | Iribanne et al. | 250/288 |
| 4,501,965 | 2/1985 | Douglas | 250/288 |
| 4,682,026 | 7/1987 | Douglas | 250/288 |

*Primary Examiner*—Bruce C. Anderson

*Attorney, Agent, or Firm*—Bruce L. Adams; Van C. Wilks

[57] ABSTRACT

An apparatus for mass-analyzing ions contained in plasma. A first vacuum chamber is maintained in a relatively low vacuum state and has a first aperture disposed adjacent to a plasma source for admitting therethrough the plasma into the first vacuum chamber. A second vacuum chamber is maintained in a relatively medium vacuum state and has a second aperture communicating between the first and second vacuum chambers. An ion extracting electrode is disposed in the second vacuum chamber for extracting ions contained in the plasma through the second aperture to form an ion stream composed of the extracted ions. A third vacuum chamber is maintained in a relatively high vacuum state and has a third aperture communicating between the second and third vacuum chambers. An ion focusing electrode is disposed in the third vacuum chamber for focusing the ion stream passing through the third aperture, and a mass spectrometer is disposed in the third vacuum chamber to receive the focused ion stream for analyzing the ions in the focused ion stream.

14 Claims, 1 Drawing Sheet

ICP MASS SPECTROMETER

BACKGROUND OF THE INVENTION

This invention relates to an apparatus for use in ICP mass analysis.

Traditionally, in an ICP mass spectrometer, the following two kinds of structures have been utilized. In FIG. 2(*a*) are illustrated structures of a sampling chamber 3 to extract ion from an ion source 1 of ICP and of a vacuum chamber 11 with an ion electrode system 6 and a mass spectrometer 10. The degree of vacuum of the sampling chamber 3 is 1 Torr., and the vacuum degree of the adjacent vacuum chamber 11 is $10^{-6}$ Torr.

In the apparatus shown in FIG. 2(*a*), that has been traditionally used, in order to increase the vacuum degree of the vacuum chamber 11 which has an ion electrode system 6 and a mass analyzer 10, becomes necessary to provide a vacuum pump with a large exhaust pipe, causing it a drawback that the pump has to be large-sized.

In FIG. 2(*b*) are illustrated structures of a sampling chamber 3 to extract ion from an ICP ion source 1, a vacuum chamber 7 with an ion electrode system 6 and another vacuum chamber 11 with a mass spectrometer 10. The degrees of vacuum of the sampling chamber 3 and two vacuum chambers 7 and 11 are 1 Torr., $10^{-4}$ Torr., and $10^{-6}$ Torr., respectively.

In the apparatus shown in FIG. 2(*b*) and disclosed in Literature 1, because the vacuum degree of the vacuum chamber 7 having the ion electrode system 6 is low, it is required to make the ion electrode system multistage in order to prevent ion scattering and to focus ion.

Literature 1: Titled: "Inductively Coupled Plasma Source Mass Spectrometry Using Continuum Flow Ion Extraction" by Messrs. A. L. Gray and A. R. Date (Appeared in Vol. 108, #1033 of Magazine "Analyst" published in 1983.)

SUMMARY OF THE INVENTION

It is an object of the invention to provide an ICP mass spectrometer simplified and small-sized as much as possible.

It is another object of the invention to increase an ion amount introduced to a mass analyzer so that the sensivity of the ICP mass spectrometer can be improved.

Other and further objects, features and advantages of the invention appear more fully from the following description.

A BRIEF EXPLANATION OF THE DRAWINGS

FIG. 1 is a schematic illustration of an ICP mass spectrometer of the invention; and FIGS. 2(*a*) and (*b*) are schematic illustrations of the conventional ICP mass spectrometer.

DETAILED DESCRIPTION OF PREFERRED EMBODIMENTS

Figure 1:
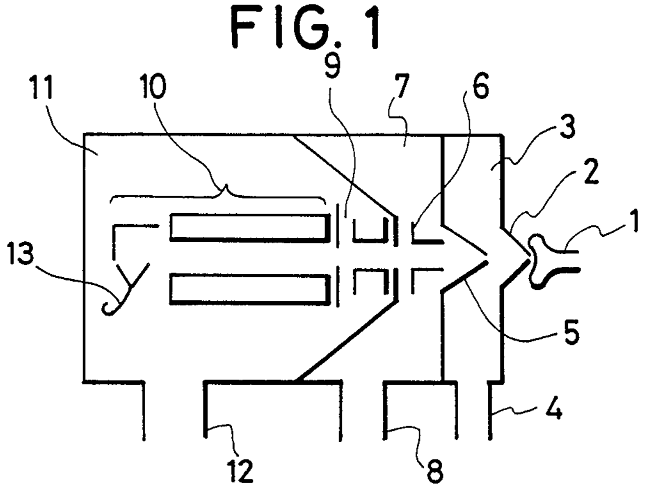
Figure 2A:
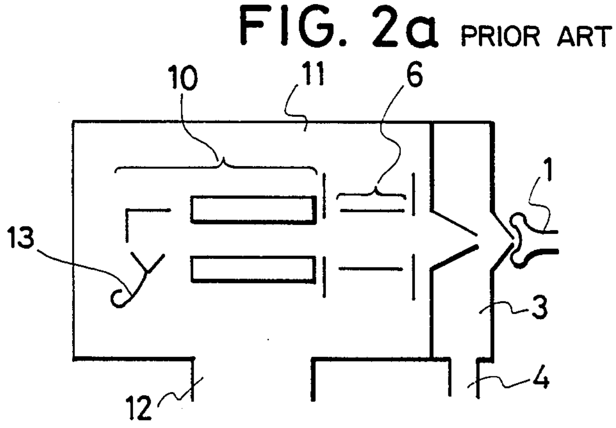
FIG. 2a PRIOR ART
Figure 2B:
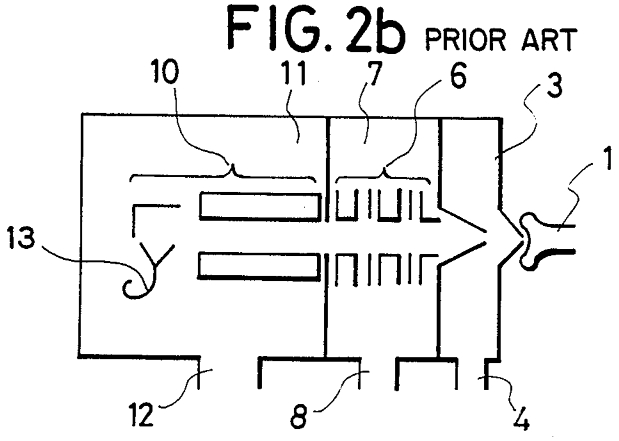
FIG. 2b PRIOR ART

In order to solve the drawback of the ICP mass spectrometer that has traditionally been used, the inventor has separated an ion electrode system in a vacuum chamber into an ion extraction part and an ion focussing part coupled with a mass analyzer, and made the vacuum chamber a 3-chamber structure as shown in FIG. 1. So as to reduce ion absorption as much as possible, the ion focussing part of the 3rd vacuum chamber is simplified. In contrast, conventional structure, the ion electrode system is made multistage, the vacuum degree is low, and the ion absorption becomes excessive so that ion amount introduced to the mass analyzer of the adjacent chamber lessens, causing such a drawback to reduce analysis sensivity.

Referring to the following drawings, detailed explanation of the invention will be made. In FIG. 1, numeral 1 shows a plasma source in which a sample material to be analyzed is introduced and transformed to inductively coupled plasma (ICP) containing ions to be analyzed. Numeral 2 is a sampling cone with a pit or aperture of 0.3–1.5 mm diameter to admit therethrough the ICP. Numeral 3 is a first sampling vacuum chamber for receiving therein the ICP through the sampling cone. The sampling chamber 3 is connected to an exhaust pipe 4 for exhausing the ICP, and is separated from the atmosphere by way of a common divider having therein the sampling cone 2. The sampling chamber is kept at 1 Torr. of the relatively low vacuum degree by a vacuum pump (not illustrated). Numeral 5 is a skimmer with a pit or aperture of a diameter of 0.5–2.0 mm to transit the ions from the sampling chamber 3. Numeral 6 is an ion extraction electrode to extract the ions contained in the ICP with a +50–500 V voltage produced by a DC source (not illustrated) to form an ion stream composed of the extracted ions. Numeral 7 is the second vacuum chamber connected to an exhaust pipe 8 and separated the sampling chamber 3 by a divider or partition having therein the skimmer 5. The 2nd vacuum chamber is maintained at $10^{-4}$ Torr. of the relatively medium vacuum degree by a vacuum pump (not illustrated). Numeral 9 is an ion focussing electrode to focus the ion stream which is extracted and formed by the ion electrode 6, after passing the ions through the plasma source 1, sampling cone 2, and the skimmer 5. Numeral 11 is a third vacuum chamber connected to an exhaust pipe 12 and separated from the second vacuum chamber 7 by a common divider or partition together with the ion electrode system. The 3rd vacuum chamber is maintained at about $10^{-6}$ Torr. of the relatively high vacuum degree by a vacuum pump (not illustrated).

The ion stream extracted from the plasma source 1 reaches a mass spectrometer 10 disposed in the third vacuum chamber 11, after passing through the ion extraction electrode 6, an aperture communicating between the second and third vacuum chambers 7 and 11 and the ion focussing electrode 9 within the 3rd vacuum chamber 11, in which about $10^{-6}$ Torr. of the vacuum degree is maintained. Ion's free moving distance within the ion focussing electrode 9 in the third vacuum chamber of about $10^{-6}$ Torr is about 100 times long as compared to that in the second vacuum chamber of about $10^{-4}$ Torr. thereby preventing the ions from scattering to introduce into the mass spectrometer 10 through the ion electrode system with one-step simple structure. Ionic quantity, which passes through the ion electrodes 6 and 9 in the ICP mass spectrometer shown in FIG. 1, can be increased in proportion to the free moving distance, so that analytical sensivity of the ICP mass spectrometer can be improved. The mass spectrometer 10 is comprised of a quadrupole mass spectrometer and a secondary electron multiplier 13 for multiplying a signal of the mass spectrometer.

According to the invention, the analytical sensivity has particularly been improved in comparison with the traditional ICP mass spectrometer with an ion electrode system which is kept in a vacuum chamber with a low degree of vacuum.

What is claimed is:

1. An inductively coupled plasma mass spectrometer comprising: a sampling cone for admitting inductively-coupled plasma containing ions under atmospheric pressure; a first vacuum chamber held in a relatively low vacuum degree and connected to the sampling cone for receiving therein the admitted plasma; an ion extraction electrode for extracting the ions contained in the plasma from the first vacuum chamber to form an ion stream; an ion focusing electrode system for focusing the ion stream; a mass spectrometer for analyzing the focussed ion stream to identify the ions contained in the plasma; a second vacuum chamber held in a relatively medium vacuum degree for accommodating therein the ion extraction electrode; a third vacuum chamber held in a relatively high vacuum degree for accommodating therein the mass spectrometer and the ion focusing electrode system; a first divider for dividing the first vacuum chamber and the second vacuum chamber from each other, the first divider having therein a first transit opening for transmitting the ions from the first vacuum chamber to the second vacuum chamber; a second divider for dividing the second vacuum chamber and the third vacuum chamber from each other, the second divider having therein a second transit opening for transmitting the ion stream from the second vacuum chamber to the third vacuum chamber; and exhausting means connected to the first vacuum chamber for exhausting the plasma from the first vacuum chamber.

2. An inductively coupled plasma mass spectrometer according to claim 1; wherein the mass spectrometer comprises a quadrupole mass spectrometer and a secondary electron multiplier for multiplying a signal of the quadrupole mass spectrometer.

3. An apparatus for analyzing ions contained in plasma comprising: a plasma source for producing plasma containing ions to be analyzed; a first vacuum chamber maintained in a relatively low vacuum state and having a first aperture disposed adjacent to the plasma source for admitting therethrough the plasma into the first vacuum chamber; a second vacuum chamber maintained in a relatively medium vacuum state and having a second aperture communicating between the first and second vacuum chambers; extracting means disposed in the second vacuum chamber for extracting ions contained in the plasma through the second aperture to form an ion stream composed of the extracted ions; a third vacuum chamber maintained in a relatively high vacuum state and having a third aperture communicating between the second and third vacuum chambers; focusing means disposed in the third vacuum chamber for focusing the ion stream passing through the third aperture; and analyzing means disposed in the third vacuum chamber to receive the focussed ion stream for analyzing the ions in the focussed ion stream.

4. An apparatus according to claim 3; wherein the plasma source includes means for producing inductively coupled plasma.

5. An apparatus according to claim 3; wherein the first vacuum chamber is maintained at about 1 Torr.

6. An apparatus according to claim 3; wherein the first vacuum chamber has a sampling cone to define the first aperture.

7. An apparatus according to claim 3; wherein the second vacuum chamber is maintained at about $10^{-4}$ Torr.

8. An apparatus according to claim 3; wherein the first and second vacuum chambers have therebetween a common partition formed with the second aperture.

9. An apparatus according to claim 3; wherein the extracting means comprises an ion extraction electrode.

10. An apparatus according to claim 3; wherein the third vacuum chamber is maintained at about $10^{-6}$ Torr.

11. An apparatus according to claim 3; wherein the second and third vacuum chambers have therebetween another common partition formed with the third aperture.

12. An apparatus according to claim 3; wherein the focusing means comprises an ion focusing electrode system.

13. An apparatus according to claim 3; wherein the analyzing means comprises a mass spectrometer.

14. An apparatus according to claim 3; wherein the analyzing means comprises a quadrupole mass spectrometer and a secondary electron multiplier.

* * * * *